US006648504B2

(12) United States Patent
Danley

(10) Patent No.: US 6,648,504 B2
(45) Date of Patent: Nov. 18, 2003

(54) SYSTEM AND METHOD FOR CALIBRATING CONTACT THERMAL RESISTANCES IN DIFFERENTIAL SCANNING CALORIMETERS

(75) Inventor: Robert L. Danley, Collingswood, NJ (US)

(73) Assignee: Waters Investment Limited, New Castle, DE (US)

(*) Notice: Subject to any disclaimer, the term of this patent is extended or adjusted under 35 U.S.C. 154(b) by 0 days.

(21) Appl. No.: 10/085,054

(22) Filed: Mar. 1, 2002

(65) Prior Publication Data

US 2003/0165179 A1 Sep. 4, 2003

(51) Int. Cl.[7] .................. G01K 19/00; G01K 17/00; G01N 25/48
(52) U.S. Cl. .................. 374/43; 374/1; 374/10; 374/33
(58) Field of Search .................. 374/43, 1, 10, 374/11, 31, 32, 33

(56) References Cited

U.S. PATENT DOCUMENTS

| | | |
|---|---|---|
| 3,263,484 A | 8/1966 | Watson et al. |
| 3,732,722 A | 5/1973 | Norem et al. |
| 4,095,453 A | 6/1978 | Woo |
| 4,330,933 A | 5/1982 | Bullinger et al. |
| 4,350,446 A | 9/1982 | Bahr et al. |
| 4,530,608 A | 7/1985 | O'Neill |
| 4,614,721 A | 9/1986 | Goldberg |
| 4,783,174 A | 11/1988 | Gmelin et al. |
| 4,812,051 A | 3/1989 | Paulik et al. |
| 5,033,866 A | 7/1991 | Kehl et al. |
| 5,174,655 A * | 12/1992 | Litz et al. .................. 374/31 |
| 5,211,477 A | 5/1993 | Li |
| 5,224,775 A | 7/1993 | Reading et al. |
| 5,288,147 A | 2/1994 | Schaefer et al. |
| 5,439,291 A * | 8/1995 | Reading .................. 374/43 |
| 5,474,385 A * | 12/1995 | Reading .................. 374/43 |

(List continued on next page.)

FOREIGN PATENT DOCUMENTS

| | | | | |
|---|---|---|---|---|
| DE | 3049105 A * | 7/1982 | .......... | G01K/17/00 |
| EP | 645619 A2 * | 3/1995 | .......... | G01N/25/48 |
| EP | 0 701 122 | 3/1996 | | |
| EP | 1136802 A1 * | 9/2001 | .......... | G01K/17/00 |
| EP | 1136803 A1 * | 9/2001 | .......... | G01N/25/48 |
| EP | 1182439 A1 * | 2/2002 | .......... | G01K/17/00 |
| WO | WO 95 33199 | 12/1995 | | |
| WO | WO 98 20314 A | 5/1998 | | |

OTHER PUBLICATIONS

"A Differential Scanning Calorimeter for Quantitative Differential Thermal Analysis," E.S. Watson and M.J. O'Neill, Analytical Chemistry, vol. 36, No. 7, pp. 1233–1238 (Jun. 1964).

(List continued on next page.)

Primary Examiner—Diego Gutierrez
Assistant Examiner—Stanley J. Pruchnic, Jr.
(74) Attorney, Agent, or Firm—Shaw Pittman LLP

(57) ABSTRACT

A system and method for obtaining the contact thermal resistance for a sample and pan without a priori knowledge of the properties of either sample, by measuring the reversing heat capacity of a sample and its pan (or an empty pan on the reference side of the DSC) at a long period and a short period during a quasi-isothermal MDSC experiment and then finding the value of contact thermal resistance that makes the short and long period heat capacities match. Several different methods may be used to find the contact thermal resistance using quasi-isothermal MDSC with a long and a short period. Two methods are direct calculation methods that use the results from an MDSC experiment used with model equations to calculate the contact thermal resistance. A third method is another direct calculation method, based upon the phase angle between the heat flow and temperature signals. A fourth and fifth method use curve fitting of the apparent heat capacity for multiple values of pan contact thermal resistance.

43 Claims, 2 Drawing Sheets

U.S. PATENT DOCUMENTS

| | | | |
|---|---|---|---|
| 5,599,104 | A | 2/1997 | Nakamura et al. |
| 5,672,289 | A | 9/1997 | O'Neill |
| 5,813,763 | A | 9/1998 | Plotnikov et al. |
| 5,842,788 | A | 12/1998 | Danley et al. |
| 6,071,008 | A * | 6/2000 | Hatta et al. .................... 374/31 |
| 6,079,873 | A | 6/2000 | Cavicchi et al. |
| 6,146,012 | A | 11/2000 | Nakamura et al. |
| 6,170,984 | B1 | 1/2001 | Schawe et al. |
| 6,200,022 | B1 | 3/2001 | Hammiche et al. |
| 6,390,669 | B1 | 5/2002 | Nakamura et al. |
| 6,428,203 | B1 * | 8/2002 | Danley .......................... 374/1 |
| 6,431,747 | B1 * | 8/2002 | Danley .......................... 374/1 |
| 6,488,406 | B2 * | 12/2002 | Danley .......................... 374/1 |

OTHER PUBLICATIONS

"Diagnosis of Phase Shift in a Temperature–Modulated Calorimetric Method," Hatta et al., Journal of Thermal Analysis., vol. 4, pp. 577–584 (1998) (no month).

"Differential Scanning Calorimetry an Introduction for Practitioners," G. Hohne, W. Hemminger and H.J. Flammersheim (Springer–Verlag, 1996), pp. 7–40 (no month).

"Heat Capacity by Multi–Frequencies Sawtooth Modulation," B. Wunderlich, R. Androsch, M. Pyda and Y.K. Kwon, submitted to Thermochimica Acta, Sep. 1999 (publ. 2000/no month) pp. 181–190.

"Heat Capacity Measurement by Modulated DSC at Constant Temperature," A. Boller, Y. Jin, B. Wunderlich, Journal of Thermal Analysis, vol. 42 (1994), pp. 307–330 (no month).

"High Precision Heat Capacity Measurement by Dynamic Differential Scanning Calorimetry," Hatta, et al., Jpn. J. Appl. Phys., vol. 35, L858–860 (Jul. 1996).

"The Analysis of Temperature Controlled Scanning Calorimeter," M.J. O'Neill, Analytical Chemistry, vol. 36, No. 7, pp. 1238–1245 (Jun. 1964).

* cited by examiner

SYSTEM AND METHOD FOR CALIBRATING CONTACT THERMAL RESISTANCES IN DIFFERENTIAL SCANNING CALORIMETERS

The present application incorporates by reference the following patent applications: U.S. patent application Ser. No. 09/533,949 (the "'949 application", now abandoned), ENTITLED "Heal Flux Differential Scanning Calorimeter," filed Mar. 23, 2000; U.S. patent application Ser. No. 09/643,870 (the "'870 application", now U.S. Pat. No. 6,431,747), entitled "Heat Flux Differential Scanning Calorimeter Sensor," filed Aug. 23, 2000; U.S. patent application Ser. No. 09/643,869 (the "'869 application", now U.S. Pat. No. 6,428,203), entitled "Power Compensation Differential Scanning Calorimeter," filed Aug. 23, 2000; U.S. patent application Ser. No. 09/767,903 (the "'903 application", now U.S. Pat. No. 6,488,406) entitled "Differential Scanning Calorimeter," filed Jan. 24, 2001; and U.S. patent application Ser. No. 09/769,313 (the "'313" application, now U.S. Pat. No. 6,561,692), filed Jan. 26, 2001, entitled "Modulated Differential Scanning Calorimeter."

BACKGROUND

1. Field of the Invention

The present invention relates generally to differential scanning calorimeters (DSCs), and more specifically to systems and methods for calibrating the contact thermal resistance between pans and sensors in DSCs.

2. Background of the Invention

Differential Scanning Calorimeters measure the heat flow to a sample as the sample temperature is varied in a controlled manner. There are two basic types of DSC, heat flux and power compensation. Brief descriptions of the two types of DSC are included below. A detailed description of the construction and theory of DSCs is disclosed in "Differential Scanning Calorimetry an Introduction for Practitioners", G. Höhne, W. Hemminger and H.-J. Flammersheim (Springer-Verlag, 1996).

Heat flux DSCs include a sensor to measure heat flow to a sample to be analyzed. The sensor has a sample position and a reference position. The sensor is installed in an oven whose temperature is varied dynamically according to a desired temperature program. As the oven is heated or cooled, the temperature difference between the sample and reference positions of the sensor is measured. This temperature difference is assumed to be proportional to the heat flow to the sample.

Power compensation DSCs include a sample and a reference holder installed in a constant temperature enclosure. Each of the holders has a heater and a temperature sensor. The average of the sample and reference holder temperatures is used to control temperature, which follows the desired temperature program. In addition, differential power proportional to the temperature difference between the holders is added to the average power to the sample holder and subtracted from the average power to the reference holder in an effort to reduce the temperature difference between sample and reference holders to zero. The differential power is assumed to be proportional to the sample heat flow and is obtained by measuring the temperature difference between the sample and reference holders. In commercial power compensation DSCs, the difference between sample and reference temperature is generally not zero because a proportional controller is used to control the differential power.

In both heat flux and power compensation DSCs, a sample to be analyzed is loaded into a pan and placed on the sample position of the DSC. An inert reference material may be loaded into a pan and placed on the reference position of the DSC, although usually the reference pan is empty. The temperature program for conventional DSCs typically includes combinations of constant heating (or cooling) rate and constant temperature segments. Modulated DSC ("MDSC"), which is described in U.S. Pat. No. 5,224,775 (the "'775 patent"), and which is incorporated by reference herein, uses a temperature program in which periodic temperature oscillations are superposed on the constant heating rate and constant temperature segments. The experimental result is the sample heat flow versus temperature or time. The heat flow signal is the result of heat flow to or from the sample due to its specific heat and as a result of transitions occurring in the sample.

For both heat flux and power compensation DSCs, a temperature difference is created between the sample and reference positions of the DSC during the dynamic portion of the DSC experiment. In heat flux DSCs, the temperature difference results principally from the combination of three differential heat flows: the difference between the sample and reference heat flow, the difference between sample and reference sensor heat flow and the difference between sample and reference pan heat flow. In power compensation DSCs, the temperature difference results principally from the combination of three differential heat flows plus the differential power supplied to the sample holders: the difference between the sample and reference heat flow, the difference between sample and reference holder heat flow and the difference between sample and reference pan heat flow. The heat flow difference between the sample and reference consists of heat flow due to the heat capacity difference between the sample and reference, the heat flow of a transition, or the difference in heating rate that occurs during an MDSC experiment. The heat flow difference between the sample and reference sections of the DSC is the result of thermal resistance and capacitance imbalances in the sensor or between the holders, and the difference in heating rate that occurs between the sample and reference sections of the DSC during a transition or during an MDSC experiment. Similarly, the heat flow difference between the sample and reference pans is the result of mass differences between the pans and the difference in heating rate that occurs during a sample transition or during a MDSC experiment.

In conventional heat flux DSCs the sensor imbalance and pan imbalance are assumed to be insignificant and the differences in heating rates are ignored. In conventional power compensation DSCs the holder imbalance and pan imbalance are assumed to be insignificant and the differences in heating rates are ignored. When the balance assumptions are satisfied and the sample heating rate is the same as the reference heating rate, the temperature difference is proportional to the sample heat flow and the differential temperature gives an accurate measure of the sample heat flow. The sample heat flow is only proportional to the measured temperature difference between sample and reference when the heating rate of the sample and reference are identical, the sensor is perfectly symmetrical, and the pan masses are identical. Proportionality of sample heat flow to temperature difference for a balanced sensor and pans occurs only during portions of the experiment when the instrument is operating at a constant heating rate, the sample is changing temperature at the same rate as the instrument and there are no transitions occurring in the sample. During Modulated DSC experiments, the heating rates of the sample and reference are generally not the same and the difference between measured sample and reference temperatures is not proportional to the sample heat flow.

Thus, the sample heat flow from a conventional DSC is not the actual sample heat flow, but includes the effects of imbalances and differences in heating rates; in other words the DSC sample heat flow measurement is smeared. For many DSC experiments, the smeared sample heat flow is a sufficiently accurate result. For example, when the desired experimental result is the total energy of the transition, such as the heat of fusion of a melt, the total peak area is integrated over a suitable baseline and the result from a conventional DSC is sufficiently accurate. If however, partial integration of the peak area is required (for example, in the study of reaction kinetics), the smeared sample heat flow of conventional DSC should not be used. Another example of when the conventional DSC result is inadequate is when two or more transitions in a sample occur within a small temperature interval. In that case, the transitions may be poorly separated in prior art DSCs because of the smearing effects.

During a transition, the heat flow to the sample increases or decreases from the pre-transition value depending upon whether the transition is exothermic or endothermic and whether the DSC is being heated or cooled. The change in sample heat flow causes the heating rate of the sample to be different from that of the DSC and as a consequence, the sample pan and sensor heating rates become different from the programmed heating rate.

U.S. patent applications Ser. Nos. 09/533,949 and 09/643,870, incorporated by reference above, disclose a heat flux DSC that uses a four term heat flow equation to account for sensor imbalances and differences in heating rate between the sample and reference sections of the sensor. The four term DSC heat flow equation derived in the '949 application is:

$$q = \Delta T_0 \cdot \left(\frac{R_r - R_s}{R_r \cdot R_s}\right) - \frac{\Delta T}{R_r} + (C_r - C_s) \cdot \frac{dT_s}{d\tau} - C_r \cdot \frac{d\Delta T}{d\tau}$$

The first term accounts for the effect of the difference between the sample sensor thermal resistance and the reference sensor thermal resistance. The second term is the conventional DSC heat flow. The third term accounts for the effect of the difference between the sensor sample thermal capacitance and the sensor reference thermal capacitance. The fourth term accounts for the effect of the difference between the heating rates of the sample and reference sides of the DSC.

U.S. patent application Ser. No. 09/643,869, incorporated by reference above, discloses a power compensation DSC that uses a five term heat flow equation to account for sample and reference holder imbalances and differences in heating rate between the sample and reference holders. The five term power compensation DSC heat flow equation derived in the '869 application is:

$$q = \Delta p + \Delta T_0 \cdot \left(\frac{R_r - R_s}{R_r \cdot R_s}\right) - \frac{\Delta T}{R_r} + (C_r - C_s) \cdot \frac{dT_s}{d\tau} - C_r \cdot \frac{d\Delta T}{d\tau}$$

The first term is the difference in power supplied to the sample position versus the power supplied to the reference position. The second term accounts for differences between the thermal resistances of the sample and reference holders. The third term accounts for the heat flow that results from the difference in temperature between the sample and reference holders and is the conventional power compensation DSC heat flow. The fourth term is the heat flow resulting from imbalances in thermal capacitance between the sample and reference holders. The fifth term reflects heat flow resulting from differences in heating rate between the sample and reference holders.

The contact thermal resistances between the sample and reference pans and the DSC sensor are needed to practice the improved methods of DSC and MDSC disclosed in U.S. patent applications Ser. Nos. 09/767,903 and 09/769,313, incorporated by reference above. Two methods for determining the contact thermal resistance are described in these applications. The first method uses the slope of the onset of a first order transition (typically a melt) to find the contact thermal resistance. The second method applies quasi-isothermal MDSC to a sample of known heat capacity. These two methods can be used to obtain typical values of the contact thermal resistances for use in a contact thermal resistance model equation that uses the thermal conductivity of the pans, sensor, DSC purge gas and three geometric parameters to calculate the contact thermal resistance. Using the typical values found by the above two methods, the geometric parameters may be determined and the model equation may be used in heat flow measurements.

However, there is an uncertainty in the heat flow measurement resulting from the use of typical values of contact thermal resistance, because the actual contact thermal resistance during an experiment almost never matches the typical value exactly. Ideally the contact thermal resistance should be determined for each pan and used in the DSC experiment that used that pan. The two methods disclosed in the '903 and 313 applications may not be used to determine the contact thermal resistance for any given experiment because they require a priori knowledge of sample properties. Either the properties of a transition in the sample in the case of the onset slope method or the sample heat capacity in the MDSC method must be known. Because these properties are the properties that one wishes to determine from DSC experiments, they are not available to determine contact thermal resistance.

References

The following references may be consulted for additional background information:

A. Boller, Y. Jin and B. Wunderlich, "Heat Capacity Measurement by Modulated DSC at Constant Temperature", Journal of Thermal Analysis V42 (1994) 307–330.

B. Wunderlich, "Temperature-Modulated Calorimetry of Polymers with Single and Multiple Frequencies to Determine Heat Capacities as well as Reversible and Irreversible Transition Parameters", *Material Characterization by Dynamic and Modulated Thermal Analysis Techniques*, ASTM STP 1402, A. Riga and L. Judovits, Eds., ASTM, Conshohocken, Pa., 2001.

B. Wunderlich, R. Androsch, M. Pyda and Y. K. Kwon, "Heat Capacity by Multi-Frequencies Saw-Tooth Modulation", Submitted to Thermochimica Acta, September 1999.

R. L. Danley and P. A. Caulfield, "Baseline Improvements Obtained by a New Heat Flow Measurement Technique", Proceedings 29th N. American Thermal Analysis Society, 2001.

R. L. Danley and P. A. Caulfield, "DSC Resolution and Dynamic Response Improvements Obtained by a New Heat Flow Measurement Technique", Proceedings 29th N. American Thermal Analysis Society, 2001.

Definitions $C_p$ is the heat capacity;
$T_p$ is the sample or reference pan temperature;
$T_s$ is the temperature of the sample sensor;
$T_r$ is the temperature of the reference sensor;
q is the sample or reference heat flow;
q1 is the amplitude of the first heat flow signal;
q2 is the amplitude of the second heat flow signal;
$q_s$ and $q_c$ are the magnitudes of the sine and cosine components
qs1 is the magnitude of the sine component of the first heat flow signal;
qs2 is the magnitude of the sine component of the second heat flow signal;
qc1 is the magnitude of the cosine component of the first heat flow signal;
$q_{c2}$ is the magnitude of the cosine component of the second heat flow signal;
$T_s$ and $T_c$ are the magnitudes of the sine and cosine components of the temperature signal, respectively;
Ts1 is the magnitude of the sine component of the first temperature signal;
Tc1 is the magnitude of the cosine component of the first temperature signal;
Ts2 is the magnitude of the sine component of the second temperature signal;
$T_{c2}$ is the magnitude of the cosine component of the second temperature signal;
$\omega_1$ is the angular frequency corresponding to the first period;
$\omega_2$ is the angular frequency corresponding to the second period;
$R_p$ is the contact thermal resistance;
$R_n$ is the nominal value of the contact thermal resistance;
$\theta$ is the product of the angular frequency $\omega$ and the elapsed time t of the experiment; and
Q is the magnitude of the heat flow.

SUMMARY OF THE INVENTION

The present invention is a system and method for obtaining the contact thermal resistance for a sample and pan without a priori knowledge of the properties of either the sample or the pan. The method of the present invention involves measuring the reversing heat capacity of a sample and its pan (or an empty pan on the reference side of the DSC) at a long period and a short period during a quasi-isothermal MDSC experiment and finding the value of contact thermal resistance that makes the short and long period heat capacities match. Several different methods may be used to find the contact thermal resistance using quasi-isothermal MDSC with a long and a short period.

The first two methods are direct calculation methods that use the results from an MDSC experiment used with model equations to calculate the contact thermal resistance. Both methods start with the measured, or apparent, heat capacity for a sample and its pan, which is given by:

$$C_p = \frac{\overline{q}}{\omega \overline{T}_p}$$

Where q is the sample or reference heat flow and $T_p$ is the sample or reference pan temperature and the overbar indicates the amplitude of the signal. The pan temperature is found from:

$$T_p = T - qR_p,$$

where T is the temperature of the sample or reference sensor and $R_p$ is the sample or reference contact thermal resistance. Both the measured temperatures and the measured heat flows are sinusoidal signals with both sine and cosine components:

$$q = q_s \sin\theta + q_c \cos\theta$$

$$T = T_s \sin\theta + T_c \cos\theta$$

Coefficients $q_s$ and $q_c$ are the magnitudes of the sine and cosine components of the heat flow signal. Coefficients $T_s$ and $T_c$ are the magnitudes of the sine and cosine components of the temperature signal, and $\theta$ is the product of the angular frequency $\omega$ and the elapsed time t of the experiment. Substituting into the above equation for the pan temperature and collecting sine and cosine components yields:

$$T_p = (T_s - q_s R_p)\sin\theta + (T_c - q_c R_p)\cos\theta$$

The magnitude of the pan temperature is the square root of the sum of the squares of the sine and cosine components, which is substituted into the heat capacity equation giving:

$$C_p = \frac{\overline{q}}{\omega\sqrt{(T_s - q_s R_p)^2 + (T_c - q_c R_p)^2}}$$

The magnitudes of the sine and cosine components of the sensor temperature and the heat flow may be found using the deconvolution technique currently employed in MDSC as disclosed in the '775 patent or any other technique for separating sine and cosine components of a signal. The first two direct calculation methods diverge at this point. The first method can be used to complete the calculation when the longer of the two periods is so long that the dependence on period essentially vanishes (i.e., vanishes for all practical purposes). In that case, the heat capacity may be found accurately regardless of the value of contact thermal resistance because the sensor and pan temperatures become essentially identical. The value of the heat capacity measured during the long period is substituted for $C_p$, and the sine and cosine magnitudes of the short period data are used on the right hand side of the equation. The result is a quadratic equation, which may be solved to find $R_p$.

$$R_p = \frac{-b \pm \sqrt{b^2 - 4ac}}{2a}$$

Where:

$$a = q_s^2 + q_c^2$$

$$b = -2(T_s q_s + T_c q_c)$$

$$c = T_s^2 + T_c^2 - \left(\frac{q_s^2 + q_c^2}{\omega C_p}\right)$$

A decision must be made as to which of the two roots is correct. The contact thermal resistance must be real and positive. If both roots are positive, the smaller of two positive roots is the correct root. If one root is negative, then the positive root is the correct root.

The second direct calculation method (which is the preferred method; it is essentially a more general version of the first method) can be used to complete the calculation by using two equations for $C_p$ as above, one each with the sine and cosine components of the temperature and heat flow signals from the long and short period measurements. The heat capacities are eliminated with the result being a quadratic equation in the contact thermal resistance $R_p$. In that case, the coefficients of the quadratic equation are:

$$a = q_{s2}^2 + q_{c2}^2 - \left(\frac{\omega_1 q_2}{\omega_2 q_1}\right)^2 (q_{s1}^2 + q_{c1}^2)$$

$$b = -2\left[q_{s2}T_{s2} + q_{c2}T_{c2} - \left(\frac{\omega_1 q_2}{\omega_2 q_1}\right)^2 (q_{s1}T_{s1} + q_{c1}T_{c1})\right]$$

$$c = T_{s2}^2 + T_{c2}^2 - \left(\frac{\omega_1 q_2}{\omega_2 q_1}\right)^2 (T_{s1}^2 + T_{c1}^2),$$

where the subscripts 1 and 2 indicate the results from the long and short period modulations, respectively, and q is the amplitude of the modulated heat flow (not the sine and cosine components).

When the long period part of the calibration experiment is very long, both the first and second methods give the same result. In principle, the second method allows any two periods to be used and does not require one of the periods to be so long that the period dependence vanishes. However, the two periods should be chosen far enough apart so that there will be substantial differences in the magnitudes of the signals. The contact thermal resistances can be tested by running a quasi-isothermal heat capacity experiment at multiple frequencies. If the contact thermal resistance is correct, the sample heat capacity and the sample and reference apparent heat capacities will be essentially independent of modulation period.

A third method is also a direct calculation method. This third method uses the phase angle between the heat flow signal and sensor temperatures, and begins by assuming that the measured heat flow is a cosine function. This assumption is not necessary, but simplifies the calculations. For quasi-isothermal MDSC experiments, when the sample is not reacting or undergoing a transition, the heat flow will be sinusoidal for a sinusoidal temperature modulation:

$$q = Q \cos \omega t,$$

where Q is the magnitude of the heat flow. The heat flowing to the sample and its pan is just the sensible heat associated with the specific heat capacity of the sample and pan:

$$q = C_p \frac{dT_p}{dt}$$

Setting the equations equal gives the sample pan temperature:

$$T_p = \frac{Q}{C_p \omega} \sin \omega t$$

As mentioned above, the equation for pan temperature in terms of sensor temperature and the measured heat flow is:

$$T_p = T - qR_p$$

Substituting the measured heat flow and the pan temperature in terms of the magnitude of the modulated heat flow into the equation for pan temperature and solving for measured temperature yields:

$$T = QR_p \cos \omega t + \frac{Q}{\omega C_p} \sin \omega t$$

The tangent of the phase angle between the measured heat flow and measured temperature is the ratio of the magnitude of the sine and cosine components of the measured temperature:

$$\tan \phi = \frac{1}{\omega C_p R_p}$$

Thus, the pan contact thermal resistance is:

$$R_p = \frac{1}{\omega C_p \tan \phi}$$

The phase angle between the sensor temperature and the heat flow can be found using the deconvolution method of the original '775 patent, or any other convenient technique that gives the phase angle. The phase angle is measured during the short period part of the calibration experiment and the heat capacity is found from the long period part of the calibration experiment. This calculation always yields a single positive valued contact thermal resistance.

A fourth and a fifth method for implementing the present invention use curve fitting of the apparent heat capacity for multiple values of pan contact thermal resistance at a short period to determine the contact thermal resistance. The calibration experiments for both of these methods use a long period and a short period quasi-isothermal modulation. In the fourth method, the long period modulation gives values of the sample and reference heat capacities that are assumed to be independent of the pan contact thermal resistance and, hence, independent of period. These values of heat capacity may be considered to be the target values. During the short period part of the calibration experiment, the sensor temperature and the heat flow are separated into their sine and cosine components. Using those signal components, several values (at least four if the function to be fitted is a quadratic, because it has three variables; more than four would be preferable) of contact thermal resistance are used to calculate values of the apparent heat capacity $C'_p$, using the following equation:

$$C'_p = \frac{q}{\omega \sqrt{(T_s - q_s R_p)^2 + (T_c - q_c R_p)^2}}$$

In practice, the number of points used depends upon the fitting method and the function to be fitted. Since, in this method calculates these points from one data set, there is no reason to limit the number of points, except in the sense that increasing the number of points would increase the computational time. In any event, if the number of variables in the function is n, then at least n+1 points are needed, with better results being obtained with a greater number of points. In a preferred embodiment, the resulting data is fitted to a quadratic equation:

$$C'_p = aR_p^2 + bR_p + c$$

Any suitable routine for curve fitting may be used. For example the "method of least squares" is a suitable curve fitting routine. The contact thermal resistance is calculated from the quadratic formula:

$$R_p = \frac{-b \pm \sqrt{b^2 - 4a(c - C_p)}}{2a}$$

where $C_p$ is the heat capacity measured at the long period modulation.

This equation gives two positive roots. The smaller root is the correct value. Occasionally, a real solution cannot be found. When that situation occurs, the maximum value of the pan contact thermal resistance from the quadratic fit is used. The maximum value for the quadratic fit is:

$$R_{pmax} = \frac{-b}{2a}.$$

It has been found that the maximum value typically results in values for the pan contact thermal resistance that yield multiple frequency apparent heat capacities that vary only a few percent, which is a substantial improvement over the methods used in the '903 or '313 applications, which use typical values for the pan contact thermal resistance.

The fifth method is similar to the fourth method, but uses two arbitrary (although substantially different) modulation periods. The apparent heat capacity versus contact thermal resistance is fitted for the results from both periods. The heat capacities are eliminated between the two equations, yielding a quadratic equation, which is solved to find the contact thermal resistance. The quadratic equation is:

$$R_p^2(a_1-a_2)+R_p(b_1-b_2)+c_1-c_2=0$$

Where, a, b and c are the coefficients of the fitted data and the subscripts 1 and 2 indicate the coefficient of each of the two different periods. The contact thermal resistance is given by:

$$R_p = \frac{-(b_1 - b_2) \pm \sqrt{(b_1 - b_2)^2 - 4(a_1 - a_2)(c_1 - c_2)}}{2(a_1 - a_2)}$$

The correct root must be chosen. It is either the positive real root, or the smaller of two real positive roots. In the case where a complex conjugate pair of roots is found, the contact thermal resistance is taken to be the maximum value of the contact thermal resistance equation:

$$R_p = \frac{-(b_1 - b_2)}{2(a_1 - a_2)}$$

In practice, methods one through five may be applied in one of two ways. In the first way, one or more quasi-isothermal calibration experiments are done at one or more temperatures to determine the pan contact thermal resistance at each of the calibration temperatures. Using this data, the DSC or MDSC experiment is performed using these values of contact thermal resistance to measure the heat flow. When multiple temperatures are used, a curve may be fitted to the data, or interpolation may be used between points. This first way is limited to samples that either do not have transitions within the range of the contact thermal resistance calibration or that have fully reversible transitions.

The second way for using the pan contact thermal resistance calibration is to use it to adjust the typical values of pan contact thermal resistance used for a given pan type. In this implementation, the contact thermal resistance calibration is performed at the beginning of a thermal program and the contact thermal resistance obtained is compared to the typical value for that pan type and purge gas at the calibration temperature. The ratio of the calibration value to the typical value is used to scale the typical value during the experiment that follows. Several additional calibration steps may be inserted at desired points within the thermal program.

DETAILED DESCRIPTION OF THE INVENTION

Apparatus

Figure 1:
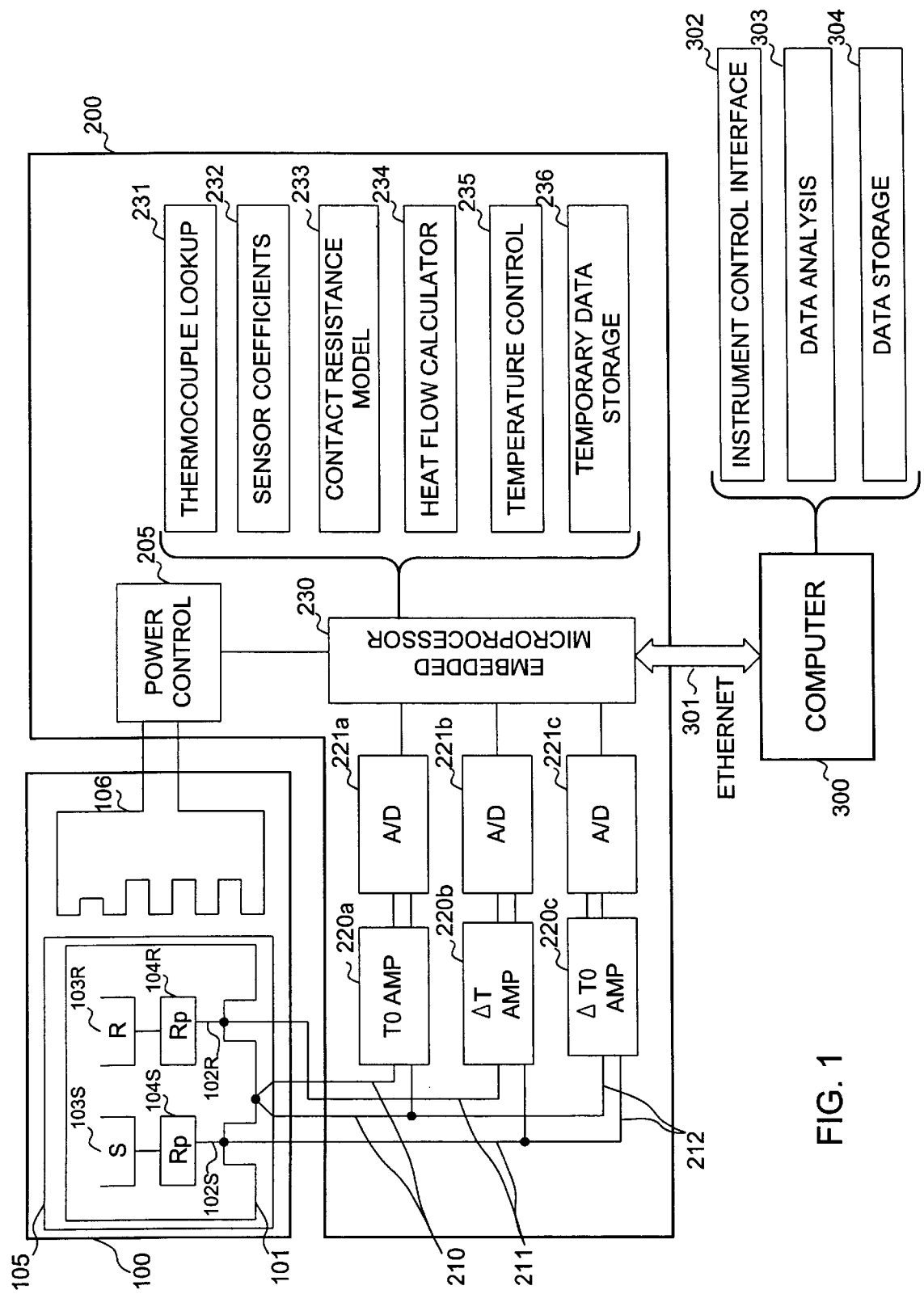
FIG. 1 is a schematic drawing of an exemplary heat flux differential scanning calorimeter adapted to practice the present invention.

FIG. 1 is a schematic diagram of an exemplary heat flux differential scanning calorimeter adapted to practice the present invention. The differential scanning calorimeter comprises three main components, DSC cell 100, DSC module 200 and computer 300. DSC cell 100 comprises a sensor assembly 101 with sample position 102S and a reference position 102R. A sample within a sample pan 103S and a reference within a reference pan 103R are placed on the sample and reference positions. [Heat is exchanged between each of the pans and its sensor position by a sample thermal contact thermal resistance 104S and a reference thermal contact thermal resistance 104R.] Sensor assembly 101 is installed within an enclosure 105 heated by heating element 106. The temperature of the DSC cell is controlled via power control 205, according to instructions received from embedded microprocessor 230. DSC module 200 includes $T_0$, $\Delta T$ and $\Delta T_0$ amplifiers 220a, 220b and 220c, respectively, which receive input from thermocouples 210, 211 and 212 as shown in FIG. 1. The output signals of the $T_0$, $\Delta T$ and $\Delta T_0$ amplifiers are converted from analog to digital signals by A/D converters 221a, 221b and 221c. The output of the A/D converters is provided to embedded microprocessor 230. Embedded microprocessor 230 comprises thermocouple lookup application 231, sensor coefficient application 232, contact thermal resistance model 233, heat flow calculation 234, temperature control application 235 and temporary data storage 236.

Thermocouple Lookup 231 is a program resident in embedded microprocessor 230 that converts the digital signal representing the output signal of the T0 thermocouple to a temperature. The temperature of the ends of the T0 thermocouple wire is measured by a thermistor, and that temperature is converted to the equivalent voltage of a thermocouple at that temperature. The equivalent thermocouple voltage is summed with the output voltage of the T0 thermocouple. The resultant reference junction compensated voltage is converted to temperature by using a table of temperature versus voltage based on NIST monograph 175.

Sensor Coefficients 232 is a program resident in embedded microprocessor 230 that determines the sensor coefficients ($R_s$, $R_r$, $C_s$, $C_r$) used in the heat flow calculation. The temperature of the DSC cell as indicated by the T0 thermocouple is used to determine the appropriate value for each of the coefficients. Sensor coefficients are generated using the calibration procedures disclosed in the '949 and '870 applications and saved in the module in tabular form. The program supplies the sensor coefficients to heat flow calculator 234.

Contact Resistance Model 233 is a program resident in the embedded microprocessor that calculates the pan contact thermal resistance using the thermal contact thermal resistance model equation described above.

Heat Flow Calculator 234 is a program resident in embedded microprocessor 230 that calculates the heat flow using the methods described in the '949 and '870 applications. The $\Delta T$, $\Delta T0$ and $T0$ signals are used as inputs. Sensor coefficients required by the program are supplied by sensor coefficient program 232 and pan contact thermal resistances needed by the program are supplied by contact thermal resistance model program 233.

Temperature Control 235 is a program resident in embedded microprocessor 230 that determines the power to be supplied to DSC heater 106. It implements a proportional plus integral plus derivative control algorithm.

Temporary Data Storage 236 is non-volatile RAM within module 200 that stores the results of an experiment during the experiment.

Embedded microprocessor 230 is in communication over, e.g., an ethernet network 301, with computer 300. Computer 300 comprises instrument control interface 302, data analysis module 303, data storage module 304.

Instrument Control Interface 302 is a program resident in computer 300 that provides the user interface to module 200. It is used to program the thermal method for the experiment to select any options and to control the instrument, e.g., start and stop experiments, select purge gas flow rates, and select instrument mode: MDSC or standard DSC.

Data Analysis 303 is a program resident in computer 300 that is used to display and process the results of the experiment. The user may select the signals to be displayed and display options such as axis scaling and selection of the abcissa. Analysis of the results may also be performed, such as integration of the area of a peak to determine the enthalpy of a transition.

Data Storage 304 is a non-volatile storage of the experimental results, e.g., a hard disk drive.

The following are step-by-step instructions for carrying out the first three methods described above in the summary of the invention. Although each of the methods is described herein as selecting parameters, such as a calibration temperature, a temperature amplitude, and a modulation period, the present invention is not limited to the manner by which these parameters are selected. For example, there are many different ways of defining a temperature program that is characterized by a calibration temperature, temperature amplitude and a modulation period (or frequency). Any way of defining a temperature program that is characterized by a calibration temperature, temperature amplitude and period (or frequency) will involve selecting a calibration temperature, temperature amplitude and period (or frequency).

Procedure

Method 1 (This Method can be Used When the Dependence of the Measured Heat Capacity on Period Vanishes for the Longer Period)

The first method described above can be carried out according to the following exemplary steps:

1. Select the calibration temperature, the temperature amplitude (typically, 0.5° C.), a long modulation period (typically, 100 seconds), and a short modulation period (typically, 30 seconds).

2. Allow the DSC cell to equilibrate at the selected calibration temperature.

3. Hold the temperature at the selected calibration temperature for an isothermal hold period of 5 minutes, to allow the signals to stabilize.

4. Modulate the temperature of the DSC cell at the long period until the temperature and heat flow amplitudes stabilize.

5. Calculate the long period apparent heat capacity using the following equation:

$$C_p = \frac{\bar{q}}{\omega \bar{T}_p}.$$

6. Modulate the temperature of the DSC cell at the short period until the temperature and heat flow amplitudes stabilize.

7. Separate the resulting temperature and heat flow amplitudes into their sine and cosine amplitudes using any convenient mathematical technique. (The preferred method uses the technique disclosed in the '775 patent.)

8. Use the apparent heat capacity from step 5 and the temperature and heat flow sine and cosine amplitudes from step 7 to calculate the pan contact thermal resistance using the quadratic formula:

$$R_p = \frac{-b \pm \sqrt{b^2 - 4ac}}{2a}$$

where:

$$a = q_s^2 + q_c^2$$

$$b = -2(T_s q_s + T_c q_c)$$

$$c = T_s^2 + T_c^2 - \left(\frac{q_s^2 + q_c^2}{\omega C_p}\right)$$

9. Select the smallest positive root as the contact thermal resistance unless complex roots are found. Complex roots occur when:

$$b^2 - 4ac < 0.$$

in which case, the contact thermal resistance is taken to be the real part:

$$R_p = \frac{-b}{2a}.$$

10. Calculate the contact thermal resistance correction factor to be applied to the contact thermal resistance function:

$$PF = \frac{Rp}{Rn},$$

where $R_p$ is the contact thermal resistance determined from step 9 and $R_n$ is the nominal value of the contact thermal resistance function at the calibration temperature as described in the '903 and '313 applications.

11. Continue with the DSC experiment using PF to adjust the value of contact thermal resistance used in calculating the heat flow.

Steps 1 through 11 may be repeated several times during a DSC or an MDSC experiment at temperatures selected by the user.

Note: For DSC experiments, only the sample pan contact thermal resistance is calculated and it is used to calibrate both the sample and reference contact thermal resistances. The contact thermal resistance of the reference pan does not affect the heat flow measurement because the sample and reference calorimeters are independent. For MDSC experiments, both the sample and reference pan contact thermal resistances are calibrated. This requires that steps 5 through 11 are applied to both the sample and reference temperature and heat flow signals.

Method 2 (Two Arbitrary Periods)

The second method described above can be carried out according to the following exemplary steps:

1. Select the calibration temperature, the temperature amplitude (typically, 0.5° C.), a long modulation period (typically, 100 seconds), and a short modulation period (typically, 30 seconds).

2. Allow the DSC cell to equilibrate at the selected calibration temperature.

3. Hold the DSC cell at the selected calibration temperature for an isothermal hold period of 5 minutes, to allow the signals to stabilize.

4. Modulate the temperature of the DSC cell at the long period until the temperature and heat flow amplitudes stabilize.

5. Separate the resulting temperature and heat flow amplitudes into their sine and cosine amplitudes using any convenient mathematical technique. Store the component values. (The preferred method uses the technique disclosed in the '775 patent.)

6. Modulate the temperature of the DSC cell at the short period until the temperature and heat flow amplitudes stabilize.

7. Separate the resulting temperature and heat flow amplitudes into their sine and cosine amplitudes using any convenient mathematical technique. Store the component values. (The preferred method uses the technique disclosed in the '775 patent.)

8. Use the temperature and heat flow sine and cosine amplitudes from steps 5 and 7 to calculate the pan contact thermal resistance using the quadratic formula:

$$R_p = \frac{-b \pm \sqrt{b^2 - 4ac}}{2a},$$

where:

$$a = q_{s2}^2 + q_{c2}^2 - \left(\frac{\omega_1 q_2}{\omega_2 q_1}\right)^2 (q_{s1}^2 + q_{c1}^2)$$

$$b = -2\left[q_{s2}T_{s2} + q_{c2}T_{c2} - \left(\frac{\omega_1 q_2}{\omega_2 q_1}\right)^2 (q_{s1}T_{s1} + q_{c1}T_{c1})\right]$$

$$c = T_{s2}^2 + T_{c2}^2 - \left(\frac{\omega_1 q_2}{\omega_2 q_1}\right)^2 (T_{s1}^2 + T_{c1}^2).$$

9. Select the smallest positive root as the contact thermal resistance unless complex roots are found. Complex roots occur when:

$$b^2 - 4ac < 0$$

in which case, the contact thermal resistance is taken to be the real part of the complex roots:

$$R_p = \frac{-b}{2a}.$$

10. Calculate the contact thermal resistance correction factor to be applied to the contact thermal resistance function:

$$PF = \frac{Rp}{Rn},$$

where $R_p$ is the contact thermal resistance determined from step 9 and $R_n$ is the nominal value of the contact thermal resistance function at the calibration temperature as described in the '903 and '313 applications.

11. Continue with the DSC experiment using PF to adjust the value of contact thermal resistance used in calculating the heat flow.

Steps 1 through 11 may be repeated several times during a DSC or an MDSC experiment at temperatures selected by the user.

Note: For DSC experiments, only the sample pan contact thermal resistance is calculated and it is used to calibrate both the sample and reference contact thermal resistances. The contact thermal resistance of the reference pan does not affect the heat flow measurement because the sample and reference calorimeters are independent. For MDSC experiments, the sample and reference pan contact thermal resistances are calibrated. This requires that steps 5 through 11 are applied to both the sample and reference temperature and heat flow signals.

Method 3 (Phase Angle Method)

The third method described above can be carried out according to the following exemplary steps:

1. Select the calibration temperature, the temperature amplitude (typically, 0.5° C.), a long modulation period (typically, 100 seconds), and a short modulation period (typically, 30 seconds).

2. Allow the DSC cell to equilibrate at the selected calibration temperature.

3. Hold the DSC cell at the selected calibration temperature for an isothermal hold period of 5 minutes, to allow the signals to stabilize.

4. Modulate the temperature of the DSC cell at the long period until the temperature and heat flow amplitudes stabilize.

5. Calculate the long period apparent heat capacity using the following equation:

$$C_p' = \frac{\bar{q}}{\omega \bar{T}_p}$$

6. Modulate the temperature of the DSC cell at the short period until the temperature and heat flow amplitudes stabilize.

7. Separate the resulting temperature and heat flow amplitudes into their sine and cosine amplitudes using any convenient mathematical technique. (The preferred method uses the technique disclosed in the '775 patent.)

8. Calculate the phase angle between the heat flow and the sensor temperature using the short period components of heat flow and sensor temperature:

$$\tan\phi = \frac{q_s}{q_c} - \frac{T_s}{T_c},$$

where the subscripts s and c indicate the amplitudes of the sine and cosine components.

9. Use the apparent heat capacity from step 5 and the phase angle from step 8 to calculate the pan contact thermal resistance according to:

$$R_p = \frac{1}{\omega C_p \tan\phi}.$$

10. Calculate the contact thermal resistance correction factor to be applied to the contact thermal resistance function:

$$PF = \frac{Rp}{Rn},$$

where $R_p$ is the contact thermal resistance determined from step 9 and $R_n$ is the nominal value of the contact thermal resistance function at the calibration temperature as described in the '903 and '313 applications.

11. Continue with the DSC experiment using PF to adjust the value of contact thermal resistance used in calculating the heat flow.

Steps 1 through 11 may be repeated several times during a DSC or an MDSC experiment at temperatures selected by the user.

Note: For DSC experiments, only the sample pan contact thermal resistance is calculated and it is used to calibrate both the sample and reference contact thermal resistances. The contact thermal resistance of the reference pan does not affect the heat flow measurement because the sample and reference calorimeters are independent. For MDSC experiments, the sample and reference pan contact thermal resistances are calibrated. This requires that steps 5 through 11 are applied to both the sample and reference temperature and heat flow signals.

Method 4 (This Method can be Used When the Dependence of the Measured Heat Capacity on Period Vanishes for the Longer Period)

The fourth method described above can be carried out according to the following exemplary steps:

1. Select the calibration temperature, the temperature amplitude (typically, 0.5° C.), a long modulation period (typically, 100 seconds), and a short modulation period (typically, 30 seconds).
2. Allow the DSC cell to equilibrate at the selected calibration temperature.
3. Hold the temperature at the selected calibration temperature for an isothermal hold period of 5 minutes, to allow the signals to stabilize.
4. Modulate the temperature of the DSC cell at the long period until the temperature and heat flow amplitudes stabilize.
5. Calculate the long period apparent heat capacity using the following equation:

$$C_p = \frac{\bar{q}}{\omega \bar{T}_p}.$$

6. Modulate the temperature of the DSC cell at the short period until the temperature and heat flow amplitudes stabilize.

7. Separate the resulting temperature and heat flow amplitudes into their sine and cosine amplitudes using any convenient mathematical technique. (The preferred method uses the technique disclosed in the '775 patent.)

8. Calculate the heat capacity over a range of contact thermal resistances using the temperature and heat flow component amplitudes from step 7 and the following equation:

$$C_p = \frac{\bar{q}}{\omega\sqrt{(T_s - q_s R_p)^2 + (T_c - q_c R_p)^2}}$$

9. Fit a quadratic polynomial to the data generated in step 8:

$$C_p = aR_p^2 + bR_p + c$$

10. Solve the quadratic to find the value of $R_p$ that corresponds to the heat capacity from step 5.

$$R_p = \frac{-b \pm \sqrt{b^2 - 4a(c - C_p)}}{2a}$$

11. Select the smallest positive root as the contact thermal resistance unless complex roots are found. Complex roots occur when:

$$b^2 - 4a(c - C_p) < 0$$

in which case, the contact thermal resistance is taken to be the real part:

$$R_p = \frac{-b}{2a}$$

12. Calculate the contact thermal resistance correction factor to be applied to the contact thermal resistance function:

$$PF = \frac{Rp}{Rn}$$

where $R_p$ is the contact thermal resistance determined from step 10 and $R_n$ is the nominal value of the contact thermal resistance function at the calibration temperature as described in the '903 and '313 applications.

13. Continue with the DSC experiment using PF to adjust the value of contact thermal resistance used in calculating the heat flow.

Steps 1 through 12 may be repeated several times during a DSC or an MDSC experiment at temperatures selected by the user.

Note: For DSC experiments, only the sample pan contact thermal resistance is calculated and it is used to calibrate both the sample and reference contact thermal resistances. The contact thermal resistance of the reference pan does not affect the heat flow measurement because the sample and reference calorimeters are independent. For MDSC experiments, both the sample and reference pan contact thermal resistances are calibrated. This requires that steps 5 through 12 be applied to both the sample and reference temperature and heat flow signals.

Method 5 (Two Arbitrary Periods)

The fifth method described above can be carried out according to the following exemplary steps:

1. Select the calibration temperature, the temperature amplitude (typically, 0.5° C.), a long modulation period (typically, 100 seconds), and a short modulation period (typically, 30 seconds).

2. Allow the DSC cell to equilibrate at selected calibration temperature.

3. Hold the DSC cell at the selected calibration temperature for an isothermal hold period of 5 minutes, to allow the signals to stabilize.

4. Modulate the temperature of the DSC cell at the long period until the temperature and heat flow amplitudes stabilize.

5. Separate the resulting temperature and heat flow amplitudes into their sine and cosine amplitudes using any convenient mathematical technique. Store the component values. (The preferred method uses the technique disclosed in the '775 patent.)

6. Calculate the heat capacity over a range of contact thermal resistances using the temperature and heat flow component amplitudes from step 5 and the following equation:

$$C_p = \frac{\bar{q}}{\omega\sqrt{(T_s - q_s R_p)^2 + (T_c - q_c R_p)^2}}$$

7. Fit a quadratic polynomial to the data generated in step 6.

$$C_p = a_1 R_p^2 + b_1 R_p + c_1$$

8. Modulate the temperature of the DSC cell at the short period until the temperature and heat flow amplitudes stabilize.

9. Separate the resulting temperature and heat flow amplitudes into their sine and cosine amplitudes using any convenient mathematical technique. Store the component values. (The preferred method uses the technique disclosed in the '775 patent.)

10. Calculate the heat capacity over a range of contact thermal resistances using the temperature and heat flow component amplitudes from step 9 and the following equation:

$$C_p = \frac{\bar{q}}{\omega\sqrt{(T_s - q_s R_p)^2 + (T_c - q_c R_p)^2}}$$

11. Fit a quadratic polynomial to the data generated in step 10.

$$C_p = a_2 R_p^2 + b_2 R_p + c_2$$

12. Using the coefficients of the polynomials from steps 7 and 11, solve the quadratic equation below to find $R_p$.

$$R_p = \frac{-(b_1 - b_2) \pm \sqrt{(b_1 - b_2)^2 - 4(a_1 - a_2)(c_1 - c_2)}}{2(a_1 - a_2)}$$

13. Select the smallest positive root as the contact thermal resistance unless complex roots are found. Complex roots occur when:

$$(b_1 - b_2)^2 - 4(a_1 - a_2)(c_1 - c_2) < 0,$$

in which case, the contact thermal resistance is taken to be the real part:

$$R_p = \frac{-(b_1 - b_2)}{2(a_1 - a_2)}$$

14. Calculate the contact thermal resistance correction factor to be applied to the contact thermal resistance function:

$$PF = \frac{Rp}{Rn}$$

where $R_p$ is the contact thermal resistance determined from step 10 and $R_n$ is the nominal value of the contact thermal resistance function at the calibration temperature as described in the '903 and '313 applications.

15. Continue with the DSC experiment using PF to adjust the value of contact thermal resistance used in calculating the heat flow.

Steps 1 through 14 may be repeated several times during a DSC or an MDSC experiment at temperatures selected by the user.

Note: For DSC experiments, only the sample pan contact thermal resistance is calculated and it is used to calibrate both the sample and reference contact thermal resistances. The contact thermal resistance of the reference pan does not affect the heat flow measurement because the sample and reference calorimeters are independent. For MDSC experiments, both the sample and reference pan contact thermal resistances are calibrated. This requires that steps 5 through 12 are applied to both the sample and reference temperature and heat flow signals.

Results

Figure 2:
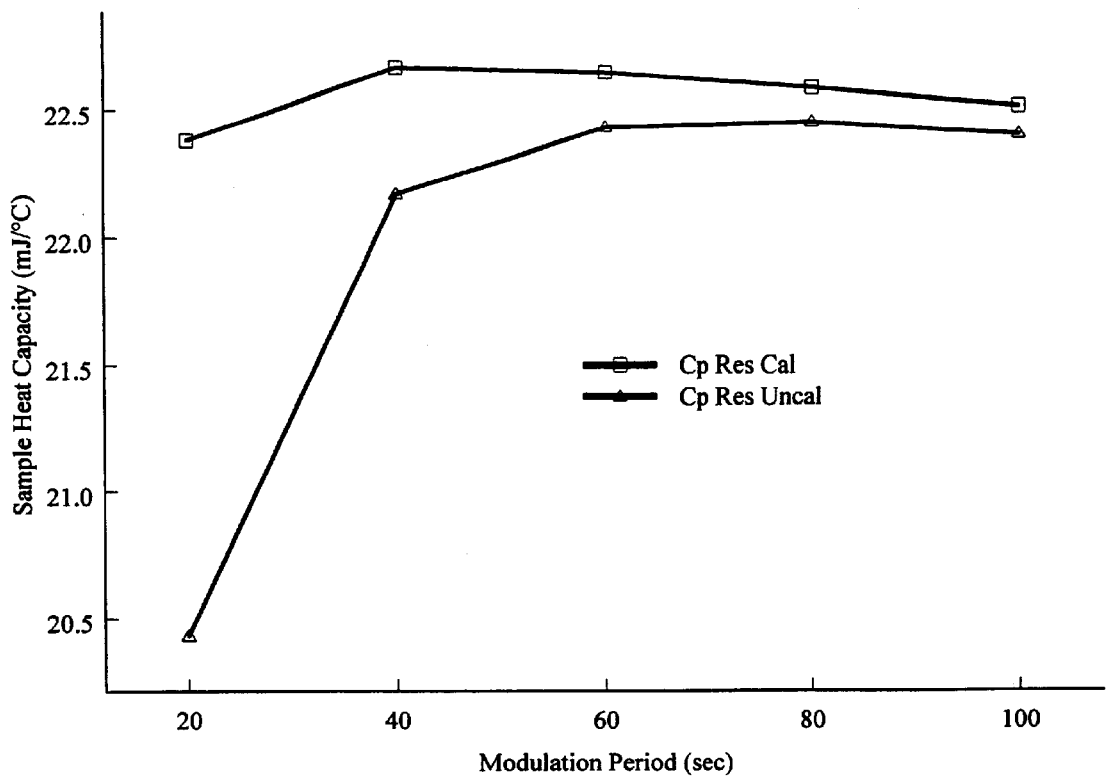
FIG. 2 is a plot showing a comparison of the typical results obtained using the present invention to calibrate the pan contact thermal resistance to the results obtained without calibrating the pan contact thermal resistance.

FIG. 2 shows the result of calibration of pan contact thermal resistances using the first method described above. The sample used was 26.25 mg of alumina powder in a nominal 25 mg aluminum pan, with an empty reference pan. A quasi-isothermal MDSC thermal method was executed at 100° C. using the MDSC method described in the '313 application, with periods of 20, 40, 60, 80 and 100 seconds. Two sets of results are shown: the sample heat capacity using the pan contact thermal resistance method of the present invention ($C_p$ Res Cal) and the sample heat capacity without pan contact thermal resistance calibration ($C_p$ Res Uncal). The reduction of variation of $C_p$ with period using the present invention is clear. Thus, using the first method to calibrate the pan contact thermal resistance, the variation of heat capacity was reduced from 2.02 mJ/° C. to 0.28 mJ/° C. However, these results may be considered illustrative of the improvement expected of all of the disclosed methods.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. For example, selecting a modulation frequency inherently selects a modulation period, and there are many different ways by which a modulation amplitude could be selected. The present invention is not limited to the way in which a temperature amplitude, modulation period, modulation frequency, or calibration temperature or other parameter may be selected, or to the exact equations disclosed herein. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for determining a contact thermal resistance in a differential scanning calorimeter comprising:
   (a) measuring a first heat flow signal and a first temperature signal at a first period using a quasi-isothermal modulated differential scanning calorimeter technique;
   (b) measuring a second heat flow signal and a second temperature signal at a second period using the quasi-isothermal modulated differential scanning calorimeter technique; and
   (c) applying two equations for heat capacity to calculate the contact thermal resistance, the first equation being based upon the first heat flow signal and the second being based upon the second heat flow signal.

2. The method of claim 1, comprising calculating the contact thermal resistance using:

$$R_p = \frac{-b \pm \sqrt{b^2 - 4ac}}{2a}$$

where:

$$a = q_{s2}^2 + q_{c2}^2 - \left(\frac{\omega_1 q_2}{\omega_2 q_1}\right)^2 (q_{s1}^2 + q_{c1}^2)$$

$$b = -2\left[q_{s2}T_{s2} + q_{c2}T_{c2} - \left(\frac{\omega_1 q_2}{\omega_2 q_1}\right)^2 (q_{s1}T_{s1} + q_{c1}T_{c1})\right]$$

$$c = T_{s2}^2 + T_{c2}^2 - \left(\frac{\omega_1 q_2}{\omega_2 q_1}\right)^2 (T_{s1}^2 + T_{c1}^2),$$

and where:
   $q_1$ is the amplitude of the first heat flow signal;
   $q_2$ is the amplitude of the second heat flow signal;
   $q_{s1}$ is the magnitude of the sine component of the first heat flow signal;
   $q_{c1}$ is the magnitude of the cosine component of the first heat flow signal;
   $T_{s1}$ is the magnitude of the sine component of the first temperature signal;
   $T_{c1}$ is the magnitude of the cosine component of the first temperature signal;
   $q_{s2}$ is the magnitude of the sine component of the second heat flow signal;
   $q_{c2}$ is the magnitude of the cosine component of the second heat flow signal;
   $T_{s2}$ is the magnitude of the sine component of the second temperature signal;
   $T_{c2}$ is the magnitude of the cosine component of the second temperature signal;
   $\omega_1$ is the angular frequency corresponding to the first period; and
   $\omega_2$ is the angular frequency corresponding to the second period.

3. A method for determining a contact thermal resistance in a differential scanning calorimeter comprising:
   (a) measuring a first heat flow signal and a first temperature signal at a first period using a quasi-isothermal modulated differential scanning calorimeter technique;
   (b) measuring a second heat flow signal and a second temperature signal at a second period using the quasi-isothermal modulated differential scanning calorimeter technique, wherein the first period is longer than the second period;
   (c) calculating a heat capacity from the heat flow measured at the first period; and
   (d) applying at least one equation for heat capacity to calculate the contact thermal resistance,
      wherein the heat capacity is used in the at least one equation for the heat capacity to calculate the contact thermal resistance.

4. The method of claim 3, comprising calculating the contact thermal resistance using:

$$R_p = \frac{-b \pm \sqrt{b^2 - 4ac}}{2a}$$

where:

$$a = q_s^2 + q_c^2$$

$$b = -2(T_s q_s + T_c q_c)$$

$$c = T_s^2 + T_c^2 - \left(\frac{q_s^2 + q_c^2}{\omega C_p}\right),$$

and where:
   $q_s$ is the magnitude of the sine component of the second heat flow signal;
   $q_c$ is the magnitude of the cosine component of the second heat flow signal;
   $T_s$ is the magnitude of the sine component of the second temperature signal;
   $T_c$ is the magnitude of the cosine component of the second temperature signal;
   $C_p$ is the heat capacity at the first period; and
   $\omega$ is the angular frequency corresponding to the second period.

5. A method for determining a contact thermal resistance of a pan in a differential scanning calorimeter comprising:
   (a) measuring a heat capacity at a long period using a quasi-isothermal modulated differential scanning calorimeter technique, wherein the long period is selected from a range of periods in which the dependence of heat capacity on period essentially vanishes;
   (b) measuring a heat flow signal and a temperature signal at a short period using the quasi-isothermal modulated differential scanning calorimeter technique;
   (c) substituting components of the measured heat flow signal and the measured temperature signal into an equation for pan temperature;
   (d) solving the equation for pan temperature to obtain an expression for the contact thermal resistance; and
   (d) calculating the value of the contact thermal resistance.

6. The method of claim 5, wherein the components of the measured heat flow signal and the measured temperature signal are sine and cosine components.

7. The method of claim 6, wherein the equation for pan temperature is:

$$T_p = (T_s - q_s R_p)\sin\theta + (T_c - q_c R_p)\cos\theta,$$

where:
- $T_p$ is the pan temperature;
- $T_s$ is the magnitude of the sine component of the temperature signal;
- $T_c$ is the magnitude of the cosine component of the temperature signal;
- $R_p$ is the contact thermal resistance; and
- $\theta$ is the product of the angular frequency $\omega$ and the elapsed time t of the experiment.

8. The method of claim 7, wherein the expression for the contact thermal resistance is:

$$R_p = \frac{-b \pm \sqrt{b^2 - 4ac}}{2a}$$

where:

$$a = q_s^2 + q_c^2$$

$$b = -2(T_s q_s + T_c q_c)$$

$$c = T_s^2 + T_c^2 - \left(\frac{q_s^2 + q_c^2}{\omega C_p}\right);$$

and where:
- $R_p$ is the contact thermal resistance;
- $q_p$ and $q_c$ are the sine and cosine components of the measured heat flow signal;
- $T_s$ and $T_c$ are the sine and cosine components of the measured temperature signal;
- $C_p$ is the heat capacity; and
- $\omega$ is the angular frequency corresponding to the short period.

9. The method of claim 8, further comprising (i) when real roots are found, using the smallest positive root in calculating the contact resistance, (ii) when complex roots are found, using the real part in calculating the contact resistance.

10. A method for determining a contact thermal resistance of a pan in a differential scanning calorimeter comprising:

(a) measuring a heat flow signal and a temperature signal at a long period using the quasi-isothermal modulated differential scanning calorimeter technique;

(b) measuring a heat flow signal and a temperature signal at a short period using the quasi-isothermal modulated differential scanning calorimeter technique;

(c) substituting components of the heat flow signal measured at the long period and the temperature signal measured at the long period into a first equation for pan temperature;

(d) substituting components of the heat flow signal measured at the short period and the temperature signal measured at the short period into a second equation for pan temperature;

(e) solving the first and second equations for pan temperature to obtain first and second expressions for heat capacity;

(f) eliminating heat capacity from the first and second expressions for heat capacity to obtain an equation for the contact thermal resistance of the pan; and (g) determining the contact thermal resistance of the pan from the equation for the contact thermal resistance of the pan.

11. The method of claim 10, wherein the equation for the contact thermal resistance of the pan is a quadratic equation.

12. The method of claim 11, comprising calculating the contact thermal resistance using:

$$R_p = \frac{-b \pm \sqrt{b^2 - 4ac}}{2a}$$

where:

$$a = q_{s2}^2 + q_{c2}^2 - \left(\frac{\omega_1 q_2}{\omega_2 q_1}\right)^2 (q_{s1}^2 + q_{c1}^2)$$

$$b = -2\left[q_{s2}T_{s2} + q_{c2}T_{c2} - \left(\frac{\omega_1 q_2}{\omega_2 q_1}\right)^2 (q_{s1}T_{s1} + q_{c1}T_{c1})\right]$$

$$c = T_{s2}^2 + T_{c2}^2 - \left(\frac{\omega_1 q_2}{\omega_2 q_1}\right)^2 (T_{s1}^2 + T_{c1}^2),$$

where the subscripts 1 and 2 refer to the measurements made at the long and the short period, respectively;

- $R_p$ is the contact thermal resistance;
- $\omega_1$ and $\omega_2$ are the angular frequencies corresponding to the long and short periods, respectively;
- $q_s$ and $q_c$ are the sine and cosine components of the measured heat flow signal;
- $T_s$ and $T_c$ are the sine and cosine components of the measured temperature signal; and q is the amplitude of the heat flow signal.

13. A method for determining a contact thermal resistance of a pan in a differential scanning calorimeter comprising:

(a) measuring a heat capacity at a long period using a quasi-isothermal modulated differential scanning calorimeter technique, wherein the long period is selected from a range of periods in which the dependence of heat capacity on period essentially vanishes;

(b) measuring a heat flow signal and a temperature signal at a short period using the quasi-isothermal modulated differential scanning calorimeter technique, wherein the heat flow signal lags the temperature signal by a phase angle;

(c) determining the phase angle between the heat flow signal and the temperature signal; and (d) determining the contact thermal resistance from the phase angle between the heat flow signal and the temperature signal and the heat capacity.

14. The method of claim 13, wherein the contact thermal resistance is determined according to the equation:

$$R_p = \frac{1}{\omega C_p \tan\phi},$$

where $\phi$ is the phase angle between the heat flow signal and the temperature signal;

- $\omega$ is the angular frequency corresponding to the short period; and
- $C_p$ is the heat capacity measured in step (a) of claim 14.

15. A method for determining a contact thermal resistance $R_p$ of a pan in a differential scanning calorimeter comprising:
  (a) measuring a heat capacity $C_p$ at a long period using a quasi-isothermal modulated differential scanning calorimeter technique, wherein the long period is selected from a range of periods in which the dependence of heat capacity on period essentially vanishes;
  (b) measuring a heat flow signal and a temperature signal at a short period using the quasi-isothermal modulated differential scanning calorimeter technique,
  (c) separating the heat flow signal and the temperature signal into their sine and cosine components;
  (d) using at least four values of contact thermal resistance in an expression for apparent heat capacity $C'_p$ to calculate one value for the apparent heat capacity corresponding to each value of contact resistance, wherein said expression comprises the sine and cosine components of the heat flow signal and the temperature signal;
  (e) fitting the values of the apparent heat capacity $C'_p$ and the contact thermal resistance $R_p$ to an equation for the apparent heat capacity $C'_p$ as a function of the contact thermal resistance $R_p$; and
  (f) calculating the contact thermal resistance $R_p$.

16. The method of claim 15, wherein the expression for apparent heat capacity is:

$$C'_p = \frac{\bar{q}}{\omega\sqrt{(T_s - q_s R_p)^2 + (T_c - q_c R_p)^2}},$$

where:
  $C'_p$ is the apparent heat capacity;
  $R_p$ is the contact thermal resistance;
  $\bar{q}$ is the amplitude of the heat flow signal;
  $\omega$ is the angular frequency;
  $T_s$ is the sine component of the temperature signal;
  $T_c$ is the cosine component of the temperature signal;
  $q_s$ is the sine component of the heat flow signal; and
  $q_c$ is the cosine component of the heat flow signal.

17. The method of claim 15, wherein the equation for the apparent heat capacity $C'_p$ is a quadratic equation in $R_p$ that can be expressed by $C'_p = aR_p^2 + bR_p + c$, where a, b and c are obtained in step (c) by fitting the quadratic equation to the values of the apparent heat capacity $C'_p$ and the contact thermal resistance $R_p$.

18. The method of claim 17, comprising calculating the contact thermal resistance using the following formula:

$$R_p = \frac{-b \pm \sqrt{b^2 - 4a(c - C_p)}}{2a},$$

where $C_p$ is the heat capacity measured in step (a), and a, b and c are the coefficients of the quadratic equation.

19. The method of claim 17, wherein the quadratic equation is fit to the values of the apparent heat capacity $C'_p$ and the contact thermal resistance $R_p$ by determining the values of a, b and c which result in a best fit of the quadratic equation to the data using a least squares curve fitting routine.

20. A method for determining a contact thermal resistance $R_p$ of a pan in a differential scanning calorimeter comprising:
  (a) measuring a first heat flow signal and a first temperature signal at a long period using a quasi-isothermal modulated differential scanning calorimeter technique;
  (b) measuring a second heat flow signal and a second temperature signal at a short period using the quasi-isothermal modulated differential scanning calorimeter technique;
  (c) separating the first heat flow signals and the first temperature signals into first sine components and first cosine components;
  (d) separating the second heat flow signals and the second temperature signals into second sine components and second cosine components;
  (e) using at least four values of contact thermal resistance in a first expression for apparent heat capacity to calculate one value for the apparent heat capacity corresponding to each value of contact thermal resistance, wherein said first expression comprises the first sine components and the first cosine components of the first heat flow signal and the first temperature signal;
  (f) using several values of contact thermal resistance in a second expression for apparent heat capacity to calculate one value for the apparent heat capacity corresponding to each value of contact thermal resistance, wherein said second expression comprises the second sine components and the second cosine components of the second heat flow signal and the second temperature signal;
  (g) fitting the values of the apparent heat capacity $C'_p$ and the contact thermal resistance $R_p$ obtained in step (e) to a first equation for the apparent heat capacity $C'_p$ as a function of the contact thermal resistance $R_p$;
  (h) fitting the values of the apparent heat capacity $C'_p$ and the contact thermal resistance $R_p$ obtained in step (f) to a second equation for the apparent heat capacity $C'_p$ as a function of the contact thermal resistance $R_p$;
  (i) eliminating the apparent heat capacities from the first and second equations, yielding a quadratic equation; and
  (j) solving the quadratic equation to determine the contact thermal resistance $R_p$.

21. The method of claim 20, wherein the quadratic equation is:

$$R_p^2(a_1 - a_2) + R_p(b_1 - b_2) + c_1 - c_2 = 0$$

wherein $a_1$, $b_1$, and $c_1$ are the coefficients of the fitted data obtained in step (g) and $a_2$, $b_2$ and $c_2$ are the coefficients of the fitted data obtained in step (h).

22. A method for determining a contact thermal resistance in a differential scanning calorimeter comprising:
  (a) selecting a calibration temperature, a temperature amplitude, a long modulation period and a short modulation period;
  (b) controlling the temperature of a cell in the differential scanning calorimeter at the selected calibration temperature;
  (c) modulating the temperature of the cell at the long period, and measuring a long period heat flow signal;
  (d) calculating a long period apparent heat capacity from the long period heat flow signal;
  (e) modulating the temperature of the cell at the short period, and measuring a short period heat flow signal and a short period temperature signal;

(f) separating the short period heat flow signal and the short period temperature signal into their sine and cosine amplitudes; and (g) calculating the pan contact thermal resistance.

23. The method of claim 22, further comprising using the value of the pan contact thermal resistance calculated in step (g) to determine a correction factor, and applying the correction factor to a nominal contact resistance.

24. The method of claim 22, wherein the pan contact thermal resistance is calculated according to:

$$R_p = \frac{-b \pm \sqrt{b^2 - 4ac}}{2a}$$

where:

$a = q_s^2 + q_c^2$ $b = -2(T_s q_s + T_c q_c)$ $$c = T_s^2 + T_c^2 - \left(\frac{q_s^2 + q_c^2}{\omega C_p}\right);$$

and where:

$R_p$ is the contact thermal resistance;

$q_s$ and $q_c$ are the sine and cosine components of the measured heat flow signal;

$T_s$ and $T_c$ are the sine and cosine components of the measured temperature signal;

$C_p$ is the heat capacity; and $\omega$ is the angular frequency corresponding to the short period.

25. A method for determining a contact thermal resistance in a differential scanning calorimeter comprising:

(a) selecting a calibration temperature, a temperature amplitude, a first modulation period and a second modulation period;

(b) controlling the temperature of a cell in the differential scanning calorimeter at the selected calibration temperature;

(c) modulating the temperature of the cell at the first period, and measuring a first heat flow signal and a first period temperature signal;

(d) modulating the temperature of the cell at the second period, and measuring a second period heat flow signal and a second period temperature signal;

(e) separating the first period heat flow signal and the first period temperature signal into their sine and cosine components to calculate the sine and cosine amplitudes of the first period heat flow signal and the first period temperature signal;

(f) separating the second period heat flow signal and the second period temperature signal into their sine and cosine components to calculate the sine and cosine amplitudes of the second period heat flow signal and the second period temperature signal; and (g) calculating the pan contact thermal resistance from the sine and cosine amplitudes of the first period heat flow signal and the first period temperature signal and the sine and cosine amplitudes of the second period heat flow signal and the second period temperature signal.

26. The method of claim 25, wherein step (g) comprises solving a quadratic equation, and wherein, if the quadratic equation has two positive roots, step (g) comprises selecting the smallest positive root of the quadratic equation.

27. The method of claim 25, wherein step (g) comprises solving a quadratic equation, and wherein, if the quadratic equation has complex roots, step (g) comprises determining the contact thermal resistance as the real part of the complex roots.

28. The method of claim 25, further comprising using the value of the pan contact thermal resistance calculated in step (g) to determine a correction factor, and applying the correction factor to a nominal contact resistance.

29. A method for determining a contact thermal resistance in a differential scanning calorimeter comprising:

(a) selecting a calibration temperature, a temperature amplitude, a long modulation period and a short modulation period;

(b) allowing a cell in the differential scanning calorimeter to equilibrate at the calibration temperature;

(c) modulating the temperature of the cell at the long modulation period and measuring a long period heat flow signal and a long period temperature signal;

(d) modulating the temperature of the cell at the short modulation period and measuring a short period heat flow signal and a short period temperature signal;

(e) calculating a long period apparent heat capacity from the long period heat flow signal and the long period temperature signal;

(f) separating the short period heat flow signal and the short period temperature signal into their sine and cosine components to calculate the sine and cosine amplitudes of the short period heat flow signal and the short period temperature signal;

(g) calculating a phase angle between the short period heat flow signal and the short period temperature signal; and (h) calculating the contact thermal resistance from the long period apparent heat capacity and from the phase angle.

30. The method of claim 29, wherein the long period apparent heat capacity is determined from:

$$C'_p = \frac{\bar{q}}{\omega \bar{T}_p}$$

where $C'_p$ is the apparent heat capacity.

31. The method of claim 29, wherein the phase angle is calculated from:

$$\tan\phi = \frac{q_s}{q_c} - \frac{T_s}{T_c}.$$

32. The method of claim 29, wherein the pan contact thermal resistance is calculated from:

$$R_p = \frac{1}{\omega C_p \tan\phi}.$$

33. The method of claim 29, further comprising using the value of the contact thermal resistance calculated in step (h) to determine a correction factor, and applying the correction factor to a nominal contact resistances.

34. A method for determining a pan contact thermal resistance in a differential scanning calorimeter comprising:

(a) selecting a calibration temperature, a temperature amplitude, a long modulation period and a short modulation period;

(b) allowing a cell in the differential scanning calorimeter to equilibrate at the calibration temperature;

(c) modulating the temperature of the cell at the long modulation period and measuring a long period heat flow signal and a long period temperature signal;

(d) modulating the temperature of the cell at the short modulation period and measuring a short period heat flow signal and a short period temperature signal;

(e) calculating a long period apparent heat capacity from the long period heat flow signal and the long period temperature signal;

(f) separating the short period heat flow signal and the short period temperature signal into their sine and cosine components to calculate the sine and cosine amplitudes of the short period heat flow signal and the short period temperature signal;

(g) calculating a range of heat capacity values as a function of a range of contact thermal resistances from the sine and cosine amplitudes of the short period heat flow signal and the short period temperature signal;

(h) fitting a quadratic polynomial to the range of heat capacity values as a function of the range of contact thermal resistances to obtain a quadratic equation; and (i) solving the quadratic equation to determine the pan contact thermal resistance.

35. The method of claim 34, further comprising selecting the smallest positive root of the quadratic equation as the pan contact thermal resistance.

36. The method of claim 34, wherein if the quadratic equation has complex roots, the pan contact thermal resistance is determined as the real part of the solution to the quadratic equation.

37. The method of claim 34, wherein the long period apparent heat capacity is determined from:

$$C'_p = \frac{\bar{q}}{\omega T_p}$$

where $C'_p$ is the apparent heat capacity.

38. The method of claim 34, wherein the range of heat capacity values as a function of a range of contact thermal resistances is calculated from:

$$C_p = \frac{\bar{q}}{\omega \sqrt{(T_s - q_s R_p)^2 + (T_c - q_c R_p)^2}}.$$

39. A method for determining a pan contact thermal resistance in a differential scanning calorimeter comprising:

(a) selecting a calibration temperature, a temperature amplitude, a long modulation period and a short modulation period;

(b) allowing a cell in the differential scanning calorimeter to equilibrate at the calibration temperature;

(c) modulating the temperature of the cell at the long modulation period and measuring a long period heat flow signal and a long period temperature signal;

(d) modulating the temperature of the cell at the short modulation period and measuring a short period heat flow signal and a short period temperature signal;

(e) separating the long period heat flow signal and the long period temperature signal into their sine and cosine components to calculate the sine and cosine amplitudes of the long period heat flow signal and the long period temperature signal;

(f) separating the short period heat flow signal and the short period temperature signal into their sine and cosine components to calculate the sine and cosine amplitudes of the short period heat flow signal and the short period temperature signal;

(g) calculating a range of long period heat capacity values as a function of a range of contact thermal resistances from the sine and cosine amplitudes of the long period heat flow signal and the long period temperature signal;

(h) calculating a range of short period heat capacity values as a function of a range of contact thermal resistances from the sine and cosine amplitudes of the short period heat flow signal and the short period temperature signal;

(i) fitting a quadratic polynomial equation to the range of heat capacity values as a function of the range of contact thermal resistances to obtain a long period set of polynomial coefficients;

(j) fitting a short period quadratic polynomial equation to the range of short period heat capacity values as a function of the range of contact thermal resistances to obtain a short period set of polynomial coefficients;

(k) using the long period set of polynomial coefficients and the short period set of polynomial coefficients to obtain a quadratic equation in the pan contact resistance; and (l) solving the quadratic equation to determine the pan contact resistance.

40. The method of claim 39, wherein the pan contact thermal resistance is determined using:

$$R_p = \frac{-(b_1 - b_2) \pm \sqrt{(b_1 - b_2)^2 - 4(a_1 - a_2)(c_1 - c_2)}}{2(a_1 - a_2)}$$

where:

$R_p$ is the pan contact thermal resistance, $a_1$, $b_1$ and $c_1$ are the long period set of polynomial coefficients and $a_2$, $b_2$ and $c_2$ are the short period set of polynomial coefficients.

41. The method of claim 39, wherein step (k) comprises eliminating the long period and short period heat capacity values to obtain the quadratic equation in the pan contact resistance.

42. The method of claim 39, wherein:

if the two solutions of the quadratic equation for the pan contact resistance are real, choosing the smallest positive root as the value for pan contact resistance; and if the two solutions of the quadratic equation for pan contact resistance are complex, choosing the real part of the solutions as the value for pan contact resistance.

43. The method of claim 39, further comprising applying a correction factor to adjust the value of the pan contact resistance.

* * * * *